Aug. 24, 1948.   N. M. MARSILIUS   2,447,808
INDEXING DEVICE

Filed Nov. 4, 1944   2 Sheets-Sheet 1

INVENTOR
Newman M. Marsilius
BY
ATTORNEY

Aug. 24, 1948.        N. M. MARSILIUS        2,447,808
                         INDEXING DEVICE
Filed Nov. 4, 1944                         2 Sheets-Sheet 2
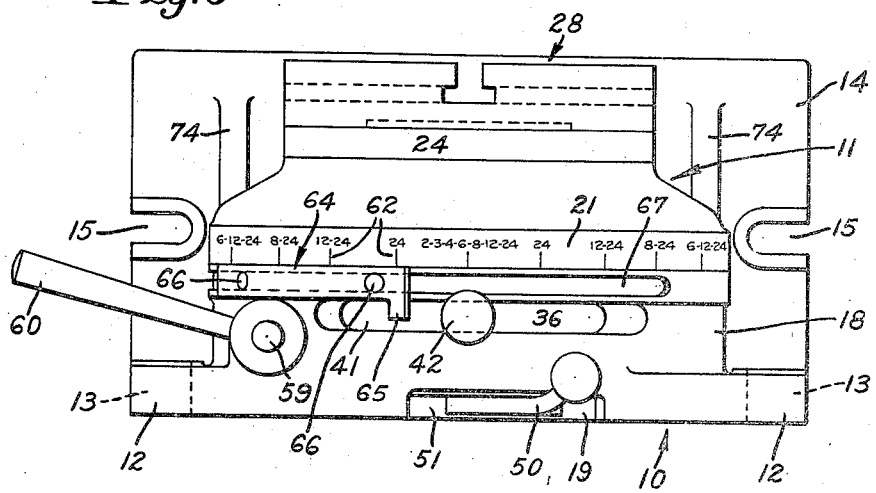
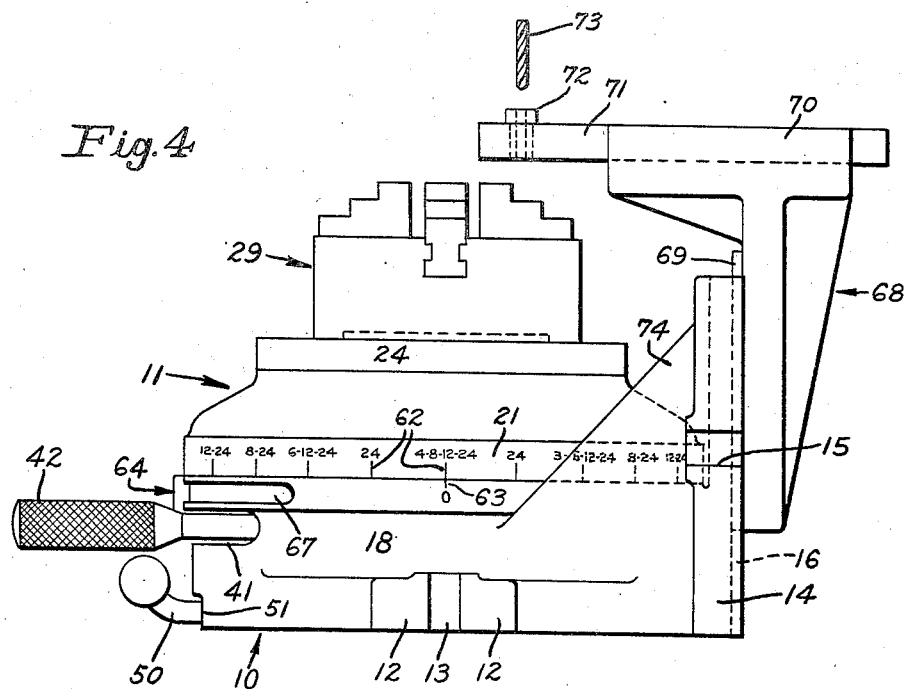
INVENTOR
Newman M. Marsilius
BY
John B. Hanrahan
ATTORNEY Patented Aug. 24, 1948

2,447,808

UNITED STATES PATENT OFFICE 2,447,808

INDEXING DEVICE

Newman M. Marsilius, Trumbull, Conn.

Application November 4, 1944, Serial No. 561,962

2 Claims. (Cl. 90—56)

This invention relates to new and useful improvements in work holders and has particular relation to an indexing device for holding work during milling, drilling, jig-boring, slotting, grinding or other operations.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 3 is a front elevational view of the device of the invention but showing the same equipped with a face plate instead of the collet structure of Figs. 1 and 2; and Fig. 4 is a side elevational view of the device of the invention the same being equipped with a work holding chuck and having a drill-jig attachment mounted thereon.

Figure 1:
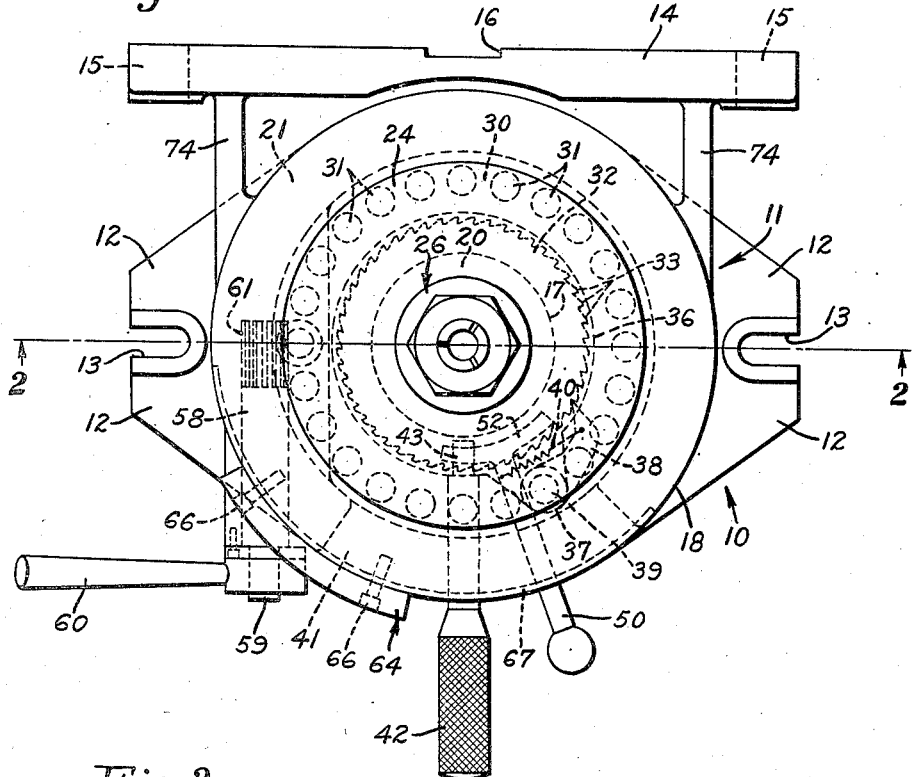
Fig. 1 is a top plan view of the device of the invention equipped with a work holding collet.
Figure 2:
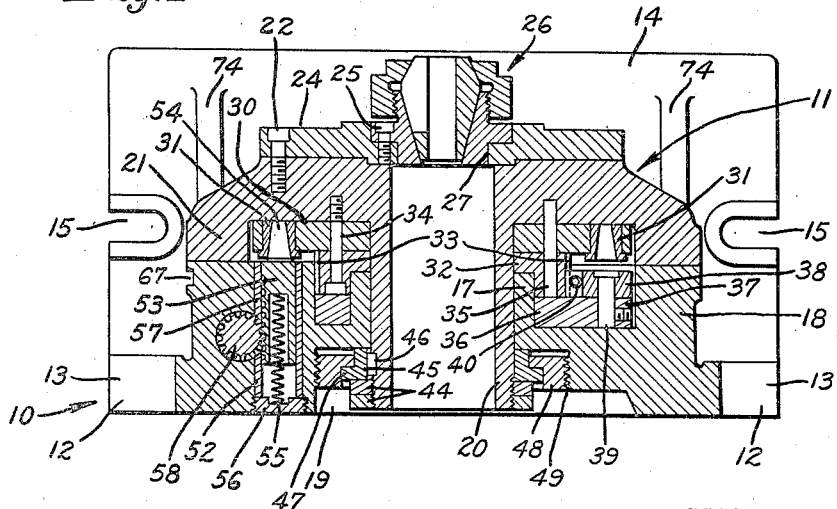
Fig. 2 is a central vertical sectional view taken as along the plane of the line 2—2 of Fig. 1.

Referring in detail to the drawings my indexing device includes a base generally designated 10 and a turret generally designated 11 mounted for turning movement on the base. Base 10 includes a pair of ears 12 each provided with a slot 13 for the reception of clamping bolts (not shown) or the like as may be used to secure the device in place on the bed or table of a milling, drilling, etc., machine.

At right angles to the ears 12 base 10 includes a mounting plate 14 provided with slots 15 for the reception of clamping bolts (not shown) or the like when the base is secured in place with plate 14 against a support. A groove 16 in the outer side of plate 14 is useful for the mounting of a drill-jig attachment as shown in Fig. 4 and as will later be more fully considered.

Base 10 includes inner and outer concentric annular walls 17 and 18 and in its side opposite that from which said walls extend is provided with an annular recess 19. Turret 11 includes a centering post 20, shown as tubular, and outwardly thereof and concentric therewith a short annular wall 21. When the turret is on the base its post 20 has bearing in the inner annular wall 17 of the base and its short annular wall 21 rests on the outer end of the outer annular wall 18 of the base. Thus the turret is mounted on the base for turning movement relative thereto.

Screws 22 secure a plate 24 on the outer side of the turret and screws 25 serve to secure a collet structure 26 to the plate 24. As shown the latter has an opening 27 to facilitate the mounting of the collet structure 26. When face plate 28 (Fig. 3) is to be used in place of the collet structure 26 removal of screws 25 permits of removal of the collet structure and substitution of the face plate. In the like manner a chuck 29 (see Fig. 4) may be substituted for the collet structure and for the face plate and the face plate or chuck, which ever is used, is mounted on the plate 24.

Fixed to the inner side of turret 11 and located between the centering post 20 and the short wall 21 is a locking plate 30 in the form of an annulus. Toward its outer periphery this plate is provided with a series of equally spaced openings in each of which is fitted and fixed a hardened and ground tapered bushing 31. Surrounding the post 20 and disposed against the inner side of and of less diameter than the plate 30 is a ratchet ring 32 toothed on its outer peripheral edge as at 33.

Ratchet ring 32 is shown as L-shaped in section and with its thinner portion fitting between the inner side of the plate 30 and the outer end of the inner annular wall 17 of the base. The same screws and dowels 34 and 25, respectively, may be used to secure both the plate 30 and the ratchet ring 32 to the inner side of the trurret 11.

Fitted in the base 10 between the walls 17 and 18 thereof, and turnable relative to the base about wall 17 is a ring 36. This ring is immediately inwardly of the ratchet 32 and includes a radial extension 37 on the upper side or on the outer side of which is mounted a pawl 38. A pin 39 serves to provide the pivotal mounting for the pawl and a small coil spring 40 serves to bias the pawl in a direction to maintain it engaged with the teeth 33 of the ratchet 32. Extending to the outer side of the base 10 through slot 41 therein and connected to manipulate the ring 36 is a handle or hand lever 42. As shown the inner end 43 of the handle 42 is threaded into a tapped hole in the edge of ring 36.

On the inner end portion of the centering post 20, within the recess 19 of the base, are a pair of turret take-up nuts 44 shown as tightened against an L-shaped part 45 keyed at 46 to the inner portion of the post. Part 45 is so arranged that an arm 47 thereof extends radially with respect to the post so that the outer side of said arm provides a shoulder. A nut 48, also within recess 19, is threaded to the base as at 49 and is transversely L-shaped but is arranged in reverse relation to the part 45 whereby a portion or arm of the nut overlies the shoulder formed by the upper or outer side of the arm 47 of part 45.

A lever or handle 50 extends to the outer side of the base through a slot 51 therein and has its inner end connected with the nut 48 whereby the latter may be turned. While the lever 50 may be secured to the nut 48 in any desired manner it is shown as provided with a head-like portion 52 which may be welded or otherwise secured to the nut.

The relationship of the parts is such that on turning of the nut 48 by the handle 50 the nut will crowd against the arm 47 of the part 45 and through such part draw the post 20 and in fact the entire turret toward the base 10 so that the inner end of the short wall 21 of the turret will be drawn or forced into rigid binding relation with the outer end of the outer annular wall 18 of the base. Thus the nut 48 and the associated parts comprise or function as a clamping means to bind the turret rigidly to the base at the engaging surfaces at the ends of the walls 18 and 21.

While the number may be varied twenty-four of the hardened and ground tapered bushings 31 are mounted by the master index locking plate 30 and each bushing comprises a socket opening through the inner side of such plate. These bushings are equally spaced. Mounted in a tubular sleeve 52 in the base 10 for reciprocating movements toward and from the turret 11 is a plunger 53. This plunger includes a hardened tapered outer end portion 54 lapped into the hardened bushings 31. The location of the plunger is such that by turning the turret on the base any one of the sockets formed by the bushings 31 may be brought into alignment with the plunger.

A coil spring 55 bearing at one end against a closure plug 56 and at its other end against the plunger 53 constantly or normally tends to move the plunger to a projected position with its portion 54 in one of the bushings 31. When the plunger is in such a location it is locking the turret to the base against any turning movement relative thereto. Along one of its sides the plunger 53 is provided with rack teeth 57.

A shaft 58 is turnable in base 10 and extends to the outer side thereof and includes a reduced end portion 59 to which is secured an operating handle or hand lever 60. On its inner end portion shaft 58 is provided with gear teeth 61 meshing with the rack teeth 57 on the side of the plunger. Thus while the spring 55 is adapted to move the plunger to projected or locking position it will be understood that the handle 60 may be manually manipulated to move the plunger to retracted position and to hold it there against the tendency of said coil spring.

In using the present indexing device the work is mounted on the turret 11 by the collet structure 26, the face plate 28 or the chuck 29 or in any other manner desired. When the turret is to be indexed the lever 50 is manipulated to ease off on the nut 48 and then the handle 60 is used to retract the locking plunger 53. While the plunger is held in retracted position the handle 42 is moved in a counter-clockwise direction (as viewed in Fig. 1) and the pawl 38 being engaged with a tooth 33 on the ratchet ring 32 the entire turret structure is turned on the base.

The turret may be moved only sufficient to bring the next socket forming bushing 31 into alignment with the plunger or it may be turned to skip a predetermined number of such sockets. When the turret has been turned to the extent desired the handle 60 is released and the coil spring 55 shifts the plunger to locking relation with the master plate 30 and the turret is again locked to the base. Now the lever 50 is used to again bind the inner end of the short wall 21 of the turret against the outer end surface of the annular outer wall 18 of the base and the device is set and the operation on the work may be resumed.

Clearly while the stroke of the lever 42 is limited by the length of the slot 41 the lever may be given several strokes, if desired, to make the adjustment of the turret of the length desired. It is noted that during counter-clockwise movements of the ring 36 by the lever or handle 42 the pawl 38 engages the teeth 33 in a manner to cause turning of the turret. However, on reverse movement of the ring 36 the pawl merely rides over the ratchet teeth 33. The turret may about its lower edge be provided with suitable graduations or marks 62 to be read in conjunction with a starting mark 63 on the base.

A stop 64 is mounted on the base 10 and includes a depending portion 65 extending part way across the slot 41 in which the handle 42 operates. The stop is secured by screws 66 or the like and is adjusted about the base along the path of a groove 67. When the stop is in place it limits return movements of the handle 42 and thus the extent of the stroke that may be given such handle. Thus means 64 comprises an adjustable indexing lever stop and when correctly positioned insures correct spacing and rapid indexing.

The present indexing device may be mounted on base 10 when the indexing is to take place about a vertical axis. When indexing about a horizontal axis is desired the entire device is turned onto its side or onto the mounting plate 14 which then becomes the supporting part of the base. With the base 10 in use a drill-jig attachment 68 may be mounted on the plate 14. Such attachment may include a rib 69 to be received in the groove 16 in the outer side of plate 14 and may also include a head 70 mounting a plate 71 for adjustment forwardly and rearwardly with respect to a plate 14 and over the turret. A drill bushing 72 is shown in plate 71 for cooperation with a drill 73 or the like. Webs 74 may be provided to strengthen the plate 14.

Having thus set forth the nature of my invention, what I claim is:

1. In an indexing device, a base including inner and outer concentric annular walls extending from one side thereof and having an annular recess in its opposite side, a ring mounted for turning movement on said base and located between said walls, a turret including a centering post having bearing in said inner annular wall and an outer short annular wall concentric with said post and resting on the outer end of the outer annular wall of the base, an annular locking plate rigid with said turret between said post and short wall and having a series of sockets opening toward the base, an annular ratchet rigid with said turret about said post and located between said locking plate and said ring, a pawl on said ring adapted to turn said ratchet and thus said turret relative to the base on manual turning of the ring on the base, a lever extending to the outer side of the base and connected with said ring, a plunger in said base, a spring normally tending to project said plunger into one of the sockets of the locking plate to lock the turret against turning movement relative to the base, said post at its inner end extending into said annular recess in the base, means in said recess and adapted to be manually actuated to force inwardly on said post to force the turret toward the base and rigidly clamp the short wall of the turret against the outer end of the outer annular wall of the base, and a hand lever extending to the outer side of the base and connected to operate said means.

2. In an indexing device, a base including inner and outer concentric annular walls extending from one side thereof, a ring mounted for turning movement on said base and located between said walls, a turret including a centering post having bearing in said inner annular wall and an outer short annular wall concentric with said post and resting on the outer end of the outer annular wall of the base, an annular locking plate rigid with said turret between said post and short wall and having a series of sockets opening toward the base, an annular ratchet rigid with said turret about said post and located between said locking plate and said ring, a pawl on said ring adapted to turn said ratchet and thus said turret relative to the base on manual turning of the ring on the base, a lever extending to the outer side of the base and connected with said ring, a plunger in said base, a spring normally tending to project said plunger into one of the sockets of the locking plate to lock the turret against turning movement relative to the base, and means manually operable to move said plunger against the action of said spring to release the plunger from said locking plate.

NEWMAN M. MARSILIUS.

REFERENCES CITED

The following references are of record in the file of this patent:

UNITED STATES PATENTS

| Number | Name | Date |
|---|---|---|
| 431,855 | Simpson | July 8, 1890 |
| 603,994 | Perry | May 10, 1898 |
| 1,268,277 | Ransdall | June 4, 1918 |
| 1,371,374 | Ibach | Mar. 15, 1921 |
| 1,737,002 | De Vlieg | Nov. 26, 1929 |
| 1,779,674 | Johnson | Oct. 28, 1930 |
| 1,956,883 | Verderber | May 1, 1934 |
| 2,144,486 | Erb | Jan. 17, 1939 |
| 2,148,779 | Senger | Feb. 28, 1939 |
| 2,292,587 | Terbrueggen | Aug. 11, 1942 |
| 2,352,489 | Melin | June 27, 1944 |